US012085143B2

(12) United States Patent
Takechi et al.

(10) Patent No.: US 12,085,143 B2
(45) Date of Patent: Sep. 10, 2024

(54) V-RIBBED BELT AND USE THEREOF

(71) Applicant: Mitsuboshi Belting Ltd., Kobe (JP)

(72) Inventors: Hiroki Takechi, Hyogo (JP); Hiroki Imai, Hyogo (JP); Manabu Mitsutomi, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 842 days.

(21) Appl. No.: 16/969,776

(22) PCT Filed: Feb. 14, 2019

(86) PCT No.: PCT/JP2019/005406
§ 371 (c)(1),
(2) Date: Aug. 13, 2020

(87) PCT Pub. No.: WO2019/160055
PCT Pub. Date: Aug. 22, 2019

(65) Prior Publication Data
US 2021/0003194 A1   Jan. 7, 2021

(30) Foreign Application Priority Data

Feb. 15, 2018 (JP) ................................. 2018-025137
Jan. 30, 2019 (JP) ................................. 2019-014655

(51) Int. Cl.
*F16G 1/21* (2006.01)
*B32B 1/00* (2024.01)
(Continued)

(52) U.S. Cl.
CPC .................. *F16G 1/21* (2013.01); *B32B 1/00* (2013.01); *B32B 5/026* (2013.01); *B32B 25/02* (2013.01);
(Continued)

(58) Field of Classification Search
CPC ..... F16G 5/06; F16G 5/08; F16G 5/04; F16G 1/21; F16G 1/04; F16G 1/28; C08L 23/16;
(Continued)

(56) References Cited

U.S. PATENT DOCUMENTS 4,486,183 A * 12/1984 Posiviata ................. F16H 55/36
474/94
5,417,619 A * 5/1995 Tajima ...................... F16G 5/20
474/260
(Continued)

FOREIGN PATENT DOCUMENTS

CN       1621441 A    6/2005
CN    101238176 A    8/2008
(Continued)

OTHER PUBLICATIONS

Apr. 16, 2019—International Search Report—Intl App PCT/JP2019/005406.
(Continued)

*Primary Examiner* — Henry Y Liu
(74) *Attorney, Agent, or Firm* — Banner & Witcoff, Ltd.

(57) ABSTRACT

A V-ribbed belt in which a friction transmission surface of a compression rubber layer is coated with a knit fabric is provided. The compression rubber layer is formed of the cured product of a rubber composition containing an ethylene-α-olefin elastomer and carbon black wherein the carbon black contains a soft carbon having a primary particle diameter of at least 40 nm and a hard carbon having a primary particle diameter of less than 40 nm. The ratio between the number of particles of the soft carbon and hard carbon is former/latter=3/97 to 25/75.

9 Claims, 4 Drawing Sheets

(51) Int. Cl.
| | |
|---|---|
| *B32B 5/02* | (2006.01) |
| *B32B 25/02* | (2006.01) |
| *B32B 25/10* | (2006.01) |
| *B32B 25/14* | (2006.01) |
| *C08K 3/04* | (2006.01) |
| *C08K 3/22* | (2006.01) |
| *C08K 5/09* | (2006.01) |
| *C08K 5/14* | (2006.01) |
| *F16G 1/04* | (2006.01) |
| *F16G 1/12* | (2006.01) |
| *F16G 1/28* | (2006.01) |

(52) U.S. Cl.
CPC .............. *B32B 25/10* (2013.01); *B32B 25/14* (2013.01); *C08K 3/04* (2013.01); *C08K 3/22* (2013.01); *C08K 5/09* (2013.01); *C08K 5/14* (2013.01); *F16G 1/04* (2013.01); *F16G 1/12* (2013.01); *F16G 1/28* (2013.01); *B32B 2250/02* (2013.01); *B32B 2264/10* (2013.01); *B32B 2264/301* (2020.08); *B32B 2413/00* (2013.01); *C08K 2003/2296* (2013.01)

(58) Field of Classification Search
CPC ... C08K 3/04; C08K 3/22; C08K 5/09; C08K 5/14; B29D 29/10; B29D 29/103; B32B 1/00; B32B 5/026; B32B 25/02; B32B 25/10; B32B 25/14; B32B 2250/02; B32B 2264/10
USPC ......................................................... 474/238
See application file for complete search history.

(56) References Cited

U.S. PATENT DOCUMENTS

| | | | | | |
|---|---|---|---|---|---|
| 5,624,515 | A * | 4/1997 | Onoe | ............................ | C08J 5/06 156/137 |
| 2001/0034282 | A1 * | 10/2001 | Hasaka | ..................... | F16G 5/20 474/263 |
| 2005/0090618 | A1 | 4/2005 | Okuno | | |
| 2005/0096433 | A1 * | 5/2005 | Takehara | ................... | F16G 5/06 525/211 |
| 2007/0060431 | A1 * | 3/2007 | Hineno | ..................... | F16G 5/06 474/263 |
| 2007/0082777 | A1 * | 4/2007 | Nishida | ..................... | F16G 5/20 474/237 |
| 2009/0298632 | A1 * | 12/2009 | Shiriike | .................... | F16G 1/10 474/263 |
| 2010/0167860 | A1 * | 7/2010 | Mori | ...................... | D03D 15/49 474/252 |
| 2010/0167861 | A1 * | 7/2010 | Shiriike | .................... | F16G 1/08 474/263 |
| 2010/0173740 | A1 | 7/2010 | Mori et al. | | |
| 2010/0240809 | A1 * | 9/2010 | Yamada | ............... | C08L 23/0815 524/81 |
| 2013/0217528 | A1 * | 8/2013 | Matsumoto | ............... | F16G 1/10 427/407.1 |
| 2014/0066244 | A1 * | 3/2014 | Furukawa | ................. | F16G 5/20 474/263 |
| 2014/0135161 | A1 | 5/2014 | Mori et al. | | |
| 2014/0364262 | A1 | 12/2014 | Mori et al. | | |
| 2015/0024892 | A1 * | 1/2015 | Hineno | ..................... | F16G 5/08 474/237 |
| 2015/0111677 | A1 * | 4/2015 | Nishiyama | ................ | F16G 5/08 474/264 |
| 2015/0219185 | A1 * | 8/2015 | Matsuda | .................... | F16G 1/08 474/237 |
| 2015/0369335 | A1 * | 12/2015 | Ishiguro | .................... | C08L 7/00 474/260 |
| 2016/0053851 | A1 * | 2/2016 | Kojima | ..................... | F16G 5/08 474/265 |
| 2017/0009847 | A1 * | 1/2017 | Mitsutomi | ............. | D04B 21/20 |
| 2017/0314641 | A1 * | 11/2017 | Kamba | ...................... | F16G 1/28 |
| 2018/0372183 | A1 * | 12/2018 | Okubo | ....................... | F16G 5/06 |

FOREIGN PATENT DOCUMENTS

| | | |
|---|---|---|
| CN | 101558251 A | 10/2009 |
| CN | 101855290 A | 10/2010 |
| CN | 103403390 A | 11/2013 |
| CN | 104160174 A | 11/2014 |
| CN | 104736884 A | 6/2015 |
| CN | 105102856 A | 11/2015 |
| CN | 105121899 A | 12/2015 |
| EP | 2952779 A1 | 12/2015 |
| JP | 2003-314624 A | 11/2003 |
| JP | 2006-322483 A | 11/2006 |
| JP | 2010-276127 A | 12/2010 |
| JP | 2010-539394 A | 12/2010 |
| JP | 2013-185678 A | 9/2013 |
| JP | 2014-167347 A | 9/2014 |
| JP | 2018-009588 A | 1/2018 |

OTHER PUBLICATIONS

Oct. 12, 2021—(EP) Extended EP Search Report—App 19754447.1.

May 28, 2021—(CN) Notification of First Office Action—App 201980012795.9, Eng Tran.

* cited by examiner

V-RIBBED BELT AND USE THEREOF

CROSS REFERENCE TO RELATED APPLICATIONS

This is a U.S. National Phase Application under 35 U.S.C. § 371 of International Application No. PCT/JP2019/005406, filed Feb. 14, 2019, which claims priority to Japanese Application Nos. 2018-025137, filed Feb. 15, 2018 and 2019-014655, filed Jan. 30, 2019, which was published Under PCT Article 21(2), the entire contents of which are incorporated herein by reference.

TECHNICAL FIELD

The present invention relates to a V-ribbed belt including a fabric (knitted cloth or the like) covering a frictional power-transmission surface of the belt and being excellent in durability and resistance to sound generation and capable of reducing torque loss, and a use method of the same.

BACKGROUND ART

Frictional power-transmission belts are used broadly for driving accessories of automobiles or for driving agricultural machines. Examples of the frictional power-transmission belts may include flat belts, V-belts, and V-ribbed belts. Such a frictional power-transmission belt is used in distinction from a meshing power-transmission belt such as a toothed belt which transmits power through mechanical meshing between a pulley and a tooth portion of the belt. Among the frictional power-transmission belts, the V-ribbed belts are generally used for driving accessories of automobiles because they can compatibly attain high power-transmission capacity and bending fatigue resistance. Chloroprene rubber has been often used as a rubber component of a rubber composition forming a compression layer of a V-ribbed belt. However, in accordance with requests to improve heat resistance, cold resistance and durability, ethylene-propylene-diene terpolymer (EPDM) is generally used recently. Further, among the V-ribbed belts, there has been known a belt in which a frictional power-transmission surface is covered with a reinforcing cloth in order to enhance wear resistance or adjust a friction coefficient. Woven fabric, knitted fabric, nonwoven fabric, etc. can be used as the reinforcing cloth. Various fibers may be used as fibers forming those reinforcing cloths in accordance with requests such as wear resistance and water absorbability.

For example, JP-T-2010-539394 (Patent Literature 1) discloses a V-ribbed belt in which each rib face is covered with canvas, the canvas is expandable in predetermined two directions and includes an elastic yarn and at least one kind of inelastic yarn, and the inelastic yarn includes a cellulose-based fiber or yarn. The literature describes that the durability of the rib face of the V-ribbed belt can be enhanced and the rib surface can be kept in a desired state by adjusting raw materials of the canvas, and the raw materials of the canvas can be selected in consideration of a property of sound generation or the like.

In a configuration in which a reinforcing cloth is provided on each rib face as in Patent Literature 1, the durability and the resistance to sound generation in the rib face can be enhanced while the bendability of the belt tends to decrease. When the bendability of the belt decreases, large energy is required for bending the belt, and a part of the energy is released to the outside as heat. Therefore, there is a concern that energy loss (torque loss) may be increased. Such a loss is not agreeable in terms of environmental performance (improvement of fuel efficiency) requested recently, and thus improvement has been required.

As a method for reducing torque loss in a V-ribbed belt, JP-A-2010-276127 (Patent Literature 2) discloses a V-ribbed belt in which a compression layer is formed of a rubber composition in which the content of ethylene-α-olefin elastomer is 45 mass % or higher and the content of carbon black is lower than 35 mass %. The literature describes that internal loss (loss tangent tan δ) can be suppressed to reduce the torque loss by use of the rubber composition in which the content of carbon black is reduced.

When the blending quantity of carbon black is reduced as in Patent Literature 2, heat generation (torque loss) can be reduced. However, in this method, there is a concern that the modulus or hardness of the rubber is lowered so that the belt may be unsuitable to power transmission with a high load. Therefore it is difficult to use the method under a recent request for power transmission with a high load.

Thus, in the conventional art, there is no V-ribbed belt that can attain both the improvement of durability and resistance to sound generation and the reduction of torque loss simultaneously.

CITATION LIST

Patent Literature

Patent Literature 1: JP-T-2010-539394 (Claim 1, paragraphs [0005] and [0012])
Patent Literature 2: JP-A-2010-276127 (Claim 2, paragraphs [0006] and [0012])

SUMMARY OF INVENTION

Technical Problem

Therefore, an object of the present invention is to provide a V-ribbed belt capable of improving durability and resistance to sound generation and reducing torque loss, and a use method thereof.

Another object of the present invention is to provide a V-ribbed belt capable of reducing torque loss even in power transmission with a high load, and a use method thereof.

Further another object of the present invention is to provide a V-ribbed belt capable of improving resistance to sound generation with water, and a use method thereof.

Solution to Problem

As a result of earnest investigation to attain the foregoing objects, the present inventors found that durability and resistance to sound generation can be improved and torque loss can be also reduced when a compression rubber layer of a V-ribbed belt having a frictional power-transmission surface covered with a knitted cloth is formed of a cured material of a rubber composition including ethylene-α-olefin elastomer and a combination of soft carbon and hard carbon at a specific ratio, the soft carbon having a primary particle size of 40 nm or more, the hard carbon having a primary particle size of less than 40 nm. Thus, the present invention was completed.

That is, a frictional power-transmission belt of the present invention is a V-ribbed belt including a compression rubber layer having a frictional power-transmission surface covered with a knitted cloth, in which the compression rubber layer includes a cured material of a rubber composition including an ethylene-α-olefin elastomer and a carbon black, the carbon black includes a soft carbon having a primary particle size of 40 nm or more and a hard carbon having a primary particle size of less than 40 nm, and a ratio of the number of particles between the soft carbon and the hard carbon satisfies a relation of former/latter=3/97 to 25/75. An average primary particle size of the soft carbon may be 45 to 100 nm. An average primary particle size of the hard carbon may be 10 to 35 nm. The rubber composition may further include a staple fiber. A proportion of the staple fiber may be 10 parts by mass or lower with respect to 100 parts by mass of the ethylene-α-olefin elastomer. A proportion of the carbon black may be 30 parts by mass or higher with respect to 100 parts by mass of the ethylene-α-olefin elastomer. The rubber composition may further include a vulcanizing agent and/or a crosslinking agent. A total proportion of the vulcanizing agent and the crosslinking agent may be 1 to 5 parts by mass with respect to 100 parts by mass of the ethylene-α-olefin elastomer. A diene content of the ethylene-α-olefin elastomer may be 1 to 3 mass %. A Mooney viscosity (ML(1+4)125° C.) of the ethylene-α-olefin elastomer may be 30 to 60.

The present invention also includes a method for using the V-ribbed belt in which a belt tension is adjusted into a range of 30 to 120 N/rib.

Advantageous Effects of Invention

In the present invention, a compression rubber layer of a V-ribbed belt having a frictional power-transmission surface covered with a knitted cloth is formed of a cured material of a rubber composition including ethylene-α-olefin elastomer and a combination of soft carbon and hard carbon at a specific ratio, the soft carbon having a primary particle size of 40 nm or more, the hard carbon having a primary particle size of less than 40 nm. Thus, durability and resistance to sound generation can be improved, and torque loss can be also reduced. Further, torque loss can be reduced even in power transmission with a high load. In addition, when the frictional power-transmission surface is covered with a knitted cloth including a cellulose-based fiber, resistance to sound generation with water can be also improved.

DESCRIPTION OF EMBODIMENT

Figure 1:
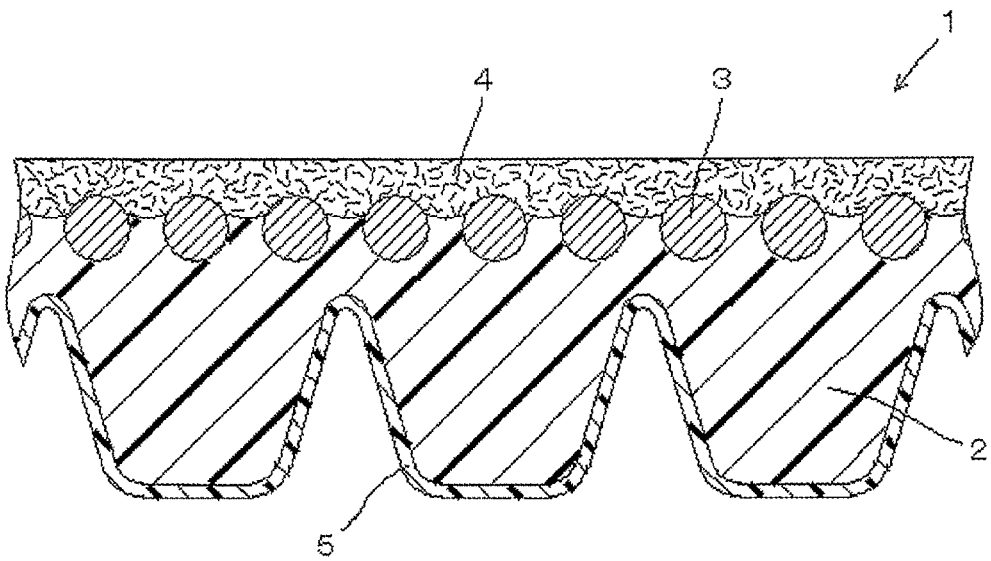
FIG. 1 is a schematic sectional view showing an example of a V-ribbed belt of the present invention.

An embodiment of the present invention will be described below in detail with reference to the accompanying drawings if necessary. A V-ribbed belt of the present invention is characterized in that a plurality of V-shaped rib portions extending in a circumferential length direction of the belt are formed, and power transmission efficiency is high. Specifically, as shown in FIG. 1, a V-ribbed belt 1 of the present invention includes a tension layer 4, a compression layer (compression rubber layer) 2, a knitted cloth 5, and a core body 3. The tension layer 4 forms a belt back surface (outer circumferential surface of the belt) and is made of a cover canvas (such as woven fabric, knitted fabric or nonwoven fabric). The compression layer (compression rubber layer) 2 is formed on one side (one surface side) of the tension layer and has a frictional power-transmission surface (a surface of a frictional power-transmission portion). The knitted cloth 5 covers (laminated on) frictional power-transmission surface of the compression layer (compression rubber layer) 2 to form an inner circumferential surface of the belt and can come into contact with a pulley. The core body 3 is buried between the tension layer 4 and the compression layer 2 along the longitudinal direction (circumferential length direction) of the belt. In this embodiment, the core body 3 is made of core wires (twisted cords) arrayed at predetermined intervals in the width direction of the belt. The core body 3 touches the tension layer 4 and the compression layer 2 so as to be placed between the two layers.

In the compression layer 2, a plurality of V-shaped section grooves extending in the longitudinal direction of the belt are formed, and a plurality of ribs each having a V-shape section (inverted trapezoid shape) are formed among the grooves so that two slops (faces) of each rib form frictional power-transmission surfaces. The frictional power-transmission surfaces can touch a pulley through the knitted cloth 5.

Incidentally, the V-ribbed belt of the present invention is not limited to the aforementioned structure. The tension layer 4 may be, for example, formed of a rubber composition. An adhesion layer may be put between the compression layer 2 and the tension layer 4 in order to improve adhesion between the core body 3 and the tension layer 4 or the compression layer 2. The core body 3 is buried between the tension layer 4 and the compression layer 2. For example, the core body 3 may be buried in the compression layer 2, or may be buried in the compression layer 2 while being brought into contact with the tension layer 4. Further, the core body 3 may be buried in the aforementioned adhesion layer, or the core body 3 may be buried between the compression layer 2 and the adhesion layer or between the adhesion layer and the tension layer 4.

The respective members constituting the belt and a method for manufacturing the belt will be described in detail below.

[Knitted Cloth]

In the present invention, the frictional power-transmission surface of the compression rubber layer is covered with the knitted cloth so that the durability and the resistance to sound generation of the V-ribbed belt can be improved. As the knitted cloth, a knitted cloth commonly used as a knitted cloth or cover canvas for covering the frictional power-transmission surface of the V-ribbed belt can be used. A knitted cloth (for example, a knitted cloth disclosed in JP-A-2016-70494) formed of a water absorbable fiber and a non-water absorbable fiber may be used so that the resistance to sound generation with water can be improved.

Examples the water absorbable fiber (or a fiber including a water absorbable yarn) include a vinyl alcohol-based fiber (such as polyvinyl alcohol, a fiber of ethylene-vinyl alcohol copolymer, or vinylon), a polyamide fiber (an aliphatic polyamide fiber such as a polyamide-6 fiber, a polyamide-66 fiber or a polyamide-46 fiber, etc.), a cellulose-based fiber [a cellulose fiber (a cellulose fiber derived from plants, animals, bacteria, etc.), and a fiber of cellulose derivatives], and a fiber derived from animals (such as wool or silk). Each of those water absorbable fibers may be used alone or two or more kinds of them may be used in combination. Among them, the cellulose fiber (particularly, a cotton fiber) is preferred.

The cellulose fiber may be a spun yarn. The thickness (count) of the cellulose fiber is, for example, about 5 to 100, preferably about 10 to 80, and more preferably about 20 to 70 (particularly 30 to 50). When the thickness is too small, there is a concern that the mechanical characteristic of the knitted cloth may deteriorate. When the thickness is too large, there is a concern that the water absorbability may be lowered.

Examples of the non-water absorbable fiber include a synthetic fiber such as a polyolefin fiber (a polyethylene fiber, a polypropylene fiber, etc.), a non-water absorbable polyamide fiber (an aromatic polyamide fiber such as an aramid fiber, etc.), an acrylic fiber, a polyester fiber [a $C_{2-4}$ alkylene $C_{6-14}$ arylate-based fiber such as a polyethylene terephthalate (PET) fiber, a polypropylene terephthalate (PPT) fiber, a polytrimethylene terephthalate (PTT) fiber, a polybutylene terephthalate (PBT) fiber or a polyethylene naphthalate (PEN) fiber, a polyarylate-based fiber, etc.], a poly-para-phenylene benzobisoxazole (PBO) fiber, or a polyurethane fiber; and an inorganic fiber such as a carbon fiber. Each of those non-water absorbable fibers may be used alone, or two or more kinds of them may be used in combination. Among them, a composite fiber of synthetic fibers (a composite yarn of synthetic fibers) is preferred. Particularly a bulk textured yarn (a polyester-based composite yarn such as a PTT/PET conjugated yarn, etc.) having an increased sectional bulkiness is preferred because it can improve the wear resistance of the knitted cloth and inhibit rubber from seeping out to the frictional power-transmission surface (or the surface of the knitted cloth).

The fineness of the non-water absorbable fiber may be, for example, about 20 to 600 dtex, preferably about 50 to 300 dtex, and more preferably about 60 to 200 dtex (particularly 70 to 100 dtex).

The proportion of the non-water absorbable fiber may be, for example, 200 parts by mass or lower (for example, 0 to 200 parts by mass) with respect to 100 parts by mass of the water absorbable fiber. The proportion of the non-water absorbable fiber may be, for example, about 1 to 100 parts by mass, preferably about 3 to 80 parts by mass (for example, 5 to 50 parts by mass), and more preferably about 10 to 40 parts by mass (particularly 20 to 30 parts by mass) with respect to 100 parts by mass of the water absorbable fiber. When the proportion of the non-water absorbable fiber is too high, there is a concern that the water absorbability of the knitted cloth is lowered to reduce the resistance to sound generation with water.

The structure of the knitted cloth is not particularly limited, but a structure used commonly can be used. A single-layer weft-knitted cloth [a weft-knitted cloth having a texture knitted by plain knitting (plain stitch)], or a multi-layer knitted cloth [such as a moss stitch (a weft knitted cloth having a texture knitted by moss stitch)] is preferred. Particularly the multilayer knitted cloth is preferred. The number of layers in the multilayer knitted cloth may be, for example, 2 to 5 layers, preferably 2 or 3 layers, and more preferably 2 layers.

A density of the fiber or yarn in the knitted cloth may be, for example, 30 per inch or higher (for example, 32 to 70 per inch, preferably 34 to 60 per inch, and more preferably 35 to 55 per inch) in each of a wale direction and a course direction. In addition, the density may be 60 per inch or higher (for example, 62 to 120 per inch, preferably 70 to 115 per inch, more preferably 80 to 110 per inch, and particularly 90 to 105 per inch) in total.

The knitted cloth may be subjected to a bonding treatment, if necessary, in order to improve adhesion to the frictional power-transmission surface. Owing to the bonding treatment, the wear resistance of the frictional power-transmission surface (surface for transmitting power) can be also improved. Examples of the bonding treatment include an immersion treatment into a resin-based treatment liquid having an adhesive component [e.g., an epoxy compound or an isocyanate compound] dissolved in an organic solvent (e.g., toluene, xylene, or methyl ethyl ketone), an immersion treatment into a resorcin-formalin-latex liquid (RFL liquid), and an immersion treatment into mucilage having a rubber composition dissolved in an organic solvent. Another bonding treatment such as a friction treatment in which the knitted cloth and a rubber composition are passed through a calender roll to thereby rub the rubber composition into the knitted cloth, a spreading treatment of applying mucilage to the knitted cloth, or a coating treatment of laminating a rubber composition on the knitted cloth may be used.

The knitted cloth may also include additives used commonly, in a surface of its fiber or inside the fiber. Examples of the additives used commonly include a surfactant, a dispersant, a filler, a coloring agent, a stabilizer, a surface treatment agent, and a leveling agent. The proportion of those other components may be 10 parts by mass or lower with respect to the knitted cloth as a whole. The proportion is, for example, about 0.01 to 5 parts by mass, preferably about 0.1 to 3 parts by mass, and more preferably about 0.5 to 2 parts by mass.

The weight of the knitted cloth may be, for example, about 50 to 500 $g/m^2$, preferably about 80 to 400 $g/m^2$, and more preferably about 100 to 350 $g/m^2$.

The thickness (average thickness) of the knitted cloth may be selected from a range of about 0.1 to 5 mm. The average thickness is, for example, about 0.3 mm or more (for example, 0.4 to 3 mm), preferably about 0.5 to 2 mm, and more preferably about 0.7 to 1.5 mm

[Compression Rubber Layer]

The compression rubber layer is formed of a cured material of a rubber composition including ethylene-α-olefin elastomer and carbon black.

[Ethylene-α-Olefin Elastomer]

For example, ethylene-α-olefin-based rubber such as ethylene propylene copolymer (EPM) or ethylene propylene diene terpolymer (EPDM or the like) may be used as the ethylene-α-olefin elastomer. Each of those ethylene-α-olefin elastomers may be used alone, or two or more kinds of them may be used in combination. Among them, the ethylene propylene diene copolymer such as EPDM is preferred owing to its excellent heat resistance, cold resistance and durability.

The Mooney viscosity (ML(1+4)125° C.) of the ethylene-α-olefin elastomer can be selected from a range of about 20 to 70. In order to inhibit the rubber composition from penetrating the knitted cloth and seeping out to the frictional power-transmission surface and to thereby improve the resistance to sound generation (particularly, resistance to sound generation during running with a high load), the Mooney viscosity is, for example, about 30 to 60, preferably about 40 to 58, and more preferably about 50 to 56. The Mooney viscosity of the ethylene-α-olefin elastomer may be a Mooney viscosity of a mixture of a plurality of kinds of ethylene-α-olefin elastomers having different Mooney viscosities. When the Mooney viscosity is too low, there is a concern that the rubber composition may tend to penetrate the knitted cloth and seep out to the frictional power-transmission surface to thereby reduce the resistance to sound generation. On the contrary, when the Mooney viscosity is too high, there is a concern that the flowability of the rubber composition may deteriorate to thereby generate a defect in the rib shape. Incidentally, in the present description and the claims, the Mooney viscosity can be measured by a method according to JIS K6300-1 (2013) on test conditions of use of an L-type rotor, a test temperature of 125° C., preheating of 1 minute, and a rotor operation time of 4 minutes.

The diene content of the ethylene-α-olefin elastomer can be selected from a range of about 0.5 to 5 mass % (for example, 1 to 4.5 mass %). In order to make it possible to increase the Mooney viscosity of the rubber composition and inhibit the rubber composition from penetrating the knitted cloth and seeping out to the frictional power-transmission surface to thereby improve the resistance to sound generation (particularly the resistance to sound generation during running with a high load), the diene content is, for example, about 0.5 to 3.5 mass %, preferably about 1 to 3 mass %, and more preferably about 1.5 to 2.8 mass % (particularly 2 to 2.5 mass %). When the diene content is too low, there is a concern that the crosslink density may be lowered to reduce the strength of the rubber. On the contrary, when the diene content is too high, there is a concern that the Mooney viscosity may be lowered to reduce the resistance to sound generation. Incidentally, in the present description and the claims, the diene content can be measured by a standard test method according to ASTM D6047-17.

The proportion of the ethylene-α-olefin elastomer to the compression rubber layer as a whole (or the whole amount of the rubber composition) may be, for example, 20 mass % or higher (for example, 25 to 80 mass %), preferably 30 mass % or higher (for example, 35 to 75 mass %), and more preferably 40 mass % or higher (for example, 45 to 70 mass %).

(Carbon Black)

Carbon black is generally classified into some grades in accordance with a difference in primary particle size, iodine adsorption quantity, nitrogen adsorption specific surface area, etc. Carbon black having a small primary particle size is suitable to application for power transmission with a high load owing to its high reinforcing effect on rubber. However, in the carbon black having a small primary particle size, torque loss tends to increase due to increase in heat generation during bending. On the other hand, carbon black having a large primary particle size is low in reinforcing effect on rubber, but can inhibit heat generation during bending and can also reduce torque loss.

According to ASTM, carbon black is classified into N0 to N9 based on iodine adsorption quantity. However, conventional classification (SAF, HAF, GPF, etc.) based on property of a rubber product where the carbon black is blended is also used. N110 (SAF), N220 (ISAF), N330 (HAF), etc. having a small primary particle size are sometimes referred to as hard carbon. N550 (FEF), N660 (GPF), N762 (SRF), etc. having a large primary particle size are sometimes referred to as soft carbon. As carbon black for use in a V-ribbed belt, hard carbon is typically used owing to its high reinforcing performance. When hard carbon is used in a V-ribbed belt, hardness and wear resistance of rubber can be improved so that the durability of the belt can be improved. On the other hand, soft carbon having low reinforcing performance has not been used so much as a reinforcing agent in a V-ribbed belt. There is a close relationship between iodine adsorption quantity and primary particle size. As the primary particle size is smaller, the iodine adsorption quantity increases. For example, SEAST (registered trademark) series made by Tokai Carbon Co., Ltd. can be classified with a relationship between iodine adsorption quantity and primary particle size as shown in Table 1.

TABLE 1

| | ASTM classification | Conventional classification | Brand | Iodine adsorption quantity (g/kg) | Average primary particle size (nm) |
|---|---|---|---|---|---|
| Hard carbon | N110 | SAF | SEAST 9 | 139 | 19 |
| | N220 | ISAF | SEAST 6 | 121 | 22 |
| | N330 | HAF | SEAST 3 | 80 | 28 |
| Soft carbon | N550 | FEF | SEAST SO | 44 | 43 |
| | N660 | GPF | SEAST V | 26 | 62 |
| | N762 | SRF | SEAST S | 26 | 66 |

In the present description and the claims, classification based on raw materials is not used. For carbon black contained in the rubber composition, carbon black having a primary particle size of 40 nm or more is referred to as soft carbon, and carbon black having a primary particle size of less than 40 nm is referred to as hard carbon.

Incidentally, in the present description and the claims, the primary particle size of the carbon black can be, for example, measured by a method using a transmission electron microscope.

In the present invention, soft carbon having a primary particle size of 40 nm or more and hard carbon having a primary particle size of less than 40 nm are combined at a specific ratio in the carbon black so that heat generation during bending of the belt can be inhibited to reduce torque loss. Further, the reinforcing effect is enhanced in addition to the reduction in torque loss, so that power transmission with a high load can be achieved. Thus, reduction in torque loss and power transmission with a high load can be attained compatibly.

The primary particle size of the soft carbon is 40 nm or more. The maximum primary particle size may be, for example, 300 nm or less, preferably 200 nm or less, and more preferably 100 nm or less. When the maximum primary particle size of the soft carbon is too large, there is a concern that the reinforcing performance of the carbon black may deteriorate to make it difficult to achieve the power transmission with a high load.

The average primary particle size of the soft carbon is, for example, about 45 to 100 nm, preferably about 50 to 90 nm (for example, 55 to 80 nm), and more preferably about 60 to 70 nm (particularly 63 to 68 nm). When the average primary particle size of the soft carbon is too small, there is a concern that the effect of reducing the torque loss may be reduced. On the contrary, when the average primary particle size of the soft carbon is too large, there is a concern that the reinforcing performance of the carbon black may deteriorate to make it difficult to achieve the power transmission with a high load.

The iodine adsorption quantity of the soft carbon may be less than 60 g/kg. The iodine adsorption quantity is, for example, about 10 g/kg or more and less than 60 g/kg, preferably about 15 to 50 g/kg, and more preferably about 18 to 40 g/kg (particularly 20 to 30 g/kg). When the iodine adsorption quantity is too small, there is a concern that the reinforcing performance of the carbon black may deteriorate to make it difficult to achieve the power transmission with a high load. On the contrary, when the iodine adsorption quantity is too large, there is a concern that the effect of reducing the torque loss may be reduced.

In the present description and the claims, the iodine adsorption quantity of the carbon black can be measured by a standard test method according to ASTM D1510-17.

The primary particle size of the hard carbon is less than 40 nm. The maximum primary particle size may be, for example, 38 nm or less, preferably 35 nm or less, and more preferably 30 nm or less. When the maximum primary particle size of the hard carbon is too large, there is a concern that power transmission with a high load may be difficult to be performed. The minimum primary particle size may be, for example, 5 nm or more, preferably 8 nm or more, and more preferably 10 nm or more. When the minimum primary particle size of the hard carbon is too small, there is a concern that the torque loss may increase.

The average primary particle size of the hard carbon is, for example, about 10 to 35 nm, preferably about 15 to 33 nm, and more preferably about 20 to 32 nm (particularly 25 to 30 nm). When the average primary particle size of the hard carbon is too small, there is a concern that the hard carbon itself cannot be prepared easily. On the contrary, when the average primary particle size is too large, there is a concern that the effect of improving the power transmission with a high load may deteriorate.

The iodine adsorption quantity of the hard carbon may be 60 g/kg or more. The iodine adsorption quantity is, for example, about 60 to 150 g/kg, preferably about 65 to 130 g/kg, and more preferably about 70 to 100 g/kg (particularly 75 to 90 g/kg). When the iodine adsorption quantity is too small, there is a concern that the effect of improving the power transmission with a high load may deteriorate. On the contrary, when the iodine adsorption quantity is too large, there is a concern that the hard carbon itself cannot be prepared easily.

The ratio in number of particles (number of primary particles) between the soft carbon and the hard carbon satisfies a relation of soft carbon/hard carbon=3/97 to 25/75. In order to secure balance of reduction in torque loss and application to power transmission with a high load, the ratio is preferably about 5/95 to 25/75, and more preferably about 7/93 to 23/77 (particularly 8/92 to 22/78). In application where torque loss in power transmission with a high load is important, the ratio may be preferably about 10/90 to 25/75, and more preferably about 15/85 to 23/77. When the proportion of the soft carbon is too low, there is a concern that the effect of reducing the torque loss cannot be obtained satisfactorily. On the contrary, when the proportion of the soft carbon is too high, there is a concern that the reinforcing effect may deteriorate so that the power transmission with a high load cannot be performed.

In the present description and the claims, the ratio in number of particles between the soft carbon and the hard carbon can be calculated based on the primary particle sizes measured by use of the transmission electron microscope. In particular, the ratio can be measured by a method which will be described in Examples later.

The ratio in mass between the soft carbon and the hard carbon can be selected suitably in accordance with requested quality. For example, in order to secure balance of reduction in torque loss and application to power transmission with a high load, the ratio can be selected from a range of about soft carbon/hard carbon=10/90 to 99/1 (for example, 30/70 to 90/10). In order to satisfy quality requested for driving accessories of an automobile, the ratio may be, for example, about soft carbon/hard carbon=40/60 to 80/20, preferably about 45/55 to 70/30, and more preferably about 50/50 to 60/40. For application where the torque loss in the power transmission with a high load is important, the ratio is, for example, about 50/50 to 95/5, preferably about 70/30 to 90/10, and more preferably about 75/25 to 80/20. When the proportion of the soft carbon is too low, there is a concern that the effect of reducing the torque loss cannot be obtained satisfactorily. On the contrary, when the ratio of the soft carbon is too high, there is a concern that the reinforcing effect may deteriorate so that the power transmission with a high load cannot be performed.

The proportion of the carbon black may be 30 parts by mass or higher with respect to 100 parts by mass of the ethylene-α-olefin elastomer. The proportion is, for example, about 30 to 150 parts by mass, preferably about 50 to 120 parts by mass, and more preferably about 70 to 110 parts by mass (particularly 80 to 100 parts by mass). When the proportion of the carbon black is too low, there is a concern that the mechanical strength of the belt may deteriorate. On the contrary, when the proportion is too high, there is a concern that uniform dispersion may become difficult.

In this manner, for the present invention, the rubber composition forming the compression rubber layer contains the soft carbon in a base of ethylene-α-olefin elastomer such as EPDM. Therefore, the sufficient effect of reducing the torque loss can be obtained. Particularly owing to the combination of the soft carbon and the hard carbon, power transmission with a high load and reduction in torque loss can be attained compatibly.

(Staple Fiber)

The curable rubber composition in the present invention may further contain a staple fiber in addition to the ethylene-α-olefin elastomer and the carbon black. However, it is preferable that a plenty of staple fiber is not contained in order to reduce the torque loss, because when a staple fiber is contained in the compression rubber layer, the bendability deteriorates to increase the torque loss. Further, in a V-ribbed belt having a frictional power-transmission surface not covered with a knitted cloth, durability and resistance to sound generation in the belt deteriorates when the staple fiber is reduced. However, in the present invention, the frictional power-transmission surface is covered with the knitted cloth, and durability and resistance to sound generation in the belt are excellent even when staple fibers are reduced or not contained at all. Thus, the amount of staple fiber can be reduced to give priority to reduction in torque loss.

Examples of the staple fiber include staple fibers exemplified above as the water absorbable fibers and the non-water absorbable fibers forming the knitted cloth [a cellulose-based staple fiber such as cotton or rayon, a polyester-based staple fiber (such as a PET staple fiber), a polyamide staple fiber (an aliphatic polyamide staple fiber such as polyamide-6 or an aramid staple fiber), etc.]. Each of those staple fibers may be used alone, or two or more kinds of them may be used in combination.

The average fiber length of the staple fiber may be, for example, about 0.1 to 30 mm (for example, 0.2 to 20 mm), preferably about 0.3 to 15 mm, and more preferably about 0.5 to 5 mm.

The staple fiber may be subjected to a surface treatment with a surfactant, a silane coupling agent, an epoxy compound, an isocyanate compound, etc. if necessary.

The staple fiber may be subjected to a bonding treatment, if necessary, in order to improve the adhesion to the ethylene-α-olefin elastomer. In the bonding treatment, a bonding treatment used commonly can be used. Examples of the bonding treatment include an immersion treatment into a resin-based treatment liquid including an adhesive component [e.g., an epoxy compound or an isocyanate compound] dissolved in an organic solvent (e.g., toluene, xylene, or methyl ethyl ketone), an immersion treatment into a resorcin-formalin-latex liquid (RFL liquid), and an immersion treatment into mucilage having a rubber composition dissolved in an organic solvent.

The proportion of the staple fiber is preferably as low as 10 parts by mass or lower with respect to 100 parts by mass of the ethylene-α-olefin elastomer in order to further reduce the torque loss. When the staple fiber is contained, the proportion thereof is, for example, about 0.1 to 10 parts by mass. The present invention has a major object on reduction in torque loss. Particularly it is preferable that the compression rubber layer does not contain the staple fiber at all.
(Vulcanizing Agent and Crosslinking Agent)

The rubber composition may further contain a vulcanizing agent and/or a crosslinking agent. Examples of the vulcanizing agent include sulfur, oximes (e.g., quinonedioxime), and guanidines (e.g., diphenylguanidine). Examples of the crosslinking agent include organic peroxide (e.g., diacylperoxide, peroxyester, and dialkylperoxide). Each of those vulcanizing agents and the crosslinking agents may be used alone or two or more kinds of them may be used in combination.

The total proportion of the vulcanizing agent and the crosslinking agent is, for example, about 1 to 5 parts by mass, preferably about 1.2 to 3 parts by mass, and more preferably about 1.5 to 2.5 parts by mass (particularly, 1.5 to 2 parts by mass) with respect to 100 parts by mass of the ethylene-α-olefin elastomer in order to inhibit cracking in ribs to thereby improve the durability. When the proportion of the vulcanizing agent and the crosslinking agent is too high, there is a concern that the rubber hardness increases excessively so that cracking in rubber (cracking in ribs) tends to occur. When the proportion is too low, there is a concern that crosslinking does not proceed sufficiently so that the strength and modulus of the rubber is too insufficient to achieve power transmission with a high load.
(Other Components)

Other rubber components or additives used commonly may be further contained in the rubber composition as other components if necessary.

Examples of the other rubber components include diene-based rubbers (e.g., natural rubber, isoprene rubber, butadiene rubber, chloroprene rubber, styrene-butadiene rubber (SBR), acrylonitrile-butadiene rubber (nitrile rubber), hydrogenated nitrile rubber (including a mixed polymer of hydrogenated nitrile rubber and a metal salt of unsaturated carboxylic acid)), chlorosulfonated polyethylene rubber, alkylated chlorosulfonated polyethylene rubber, epichlorohydrin rubber, acrylic rubber, silicone rubber, urethane rubber, and fluororubber. Each of those rubber components may be used alone, or two or more of them may be used in combination.

The proportion of the other rubber components may be 10 parts by mass or lower (for example, 0.1 to 10 parts by mass) with reference to 100 parts by mass of the ethylene-α-olefin elastomer.

Examples of the additives used commonly include a vulcanization aid, a vulcanization accelerator, a vulcanization retarder, a reinforcing agent (e.g., silicon oxide such as hydrated silica), a metal oxide (e.g., zinc oxide, magnesium oxide, calcium oxide, barium oxide, iron oxide, copper oxide, titanium oxide, or aluminum oxide), a filler (e.g., clay, calcium carbonate, talc, or mica), a plasticizer, a softener (e.g., oils such as paraffin oil, and naphthene-based oil), a processing agent or processing aid (e.g., stearic acid, metal stearate, wax, or paraffin), an anti-aging agent (e.g., an aromatic amine-based anti-aging agent, or a benzimidazole-based anti-aging agent), an adhesion improver [e.g., resorcin-formaldehyde condensate, melamine resin such as hexamethoxymethylmelamine, condensate thereof (such as resorcin-melamine-formaldehyde condensate), etc.], a colorant, a tackifier, a coupling agent (e.g., silane coupling agent), a stabilizer (e.g., antioxidant, ultraviolet absorber, or thermostabilizer), a lubricant, a flame retardant, an antistatic agent, etc. Each of those additives may be used alone or two or more kinds of them may be used in combination.

Those additives can be selected suitably in accordance with the kinds of the additives. The total proportion of the additives is, for example, about 0.1 to 30 parts by mass, preferably about 1 to 20 parts by mass, and more preferably about 5 to 15 parts by mass with respect to 100 parts by mass of the ethylene-α-olefin elastomer.
(Properties of Compression Rubber Layer)

Rubber hardness Hs of the compression rubber layer can be selected from a range of about 75 to 100°. The rubber hardness is, for example, about 78 to 90°, preferably about 79 to 85°, and more preferably about 80 to 84° (particularly 81 to 83°). When the rubber hardness is too small, there is a concern that the durability and the resistance to sound generation may deteriorate. On the contrary, when the rubber hardness is too large, there is a concern that the torque loss may increase.

In the present description and the claims, the rubber hardness of the compression rubber layer designates a value Hs (JIS A) measured according to a durometer hardness test (type A) stipulated in JIS K6253 (2012) (Rubber, vulcanized or thermoplastic-Determination of hardness-).

The thickness (average thickness) of the compression rubber layer may be, for example, about 1 to 30 mm, preferably about 1.5 to 25 mm, and more preferably about 2 to 20 mm
[Core Body]

The core body is not particularly limited. Normally, core wires (twisted cords) arrayed at predetermined intervals in the width direction of the belt can be used. Each core wire is not particularly limited. For example, the core wire may include a synthetic fiber such as a polyester fiber (e.g., a polyalkylene arylate-based fiber) or a polyamide fiber (e.g., aramid fiber), or an inorganic fiber such as a carbon fiber.

A twisted cord (such as an organzine one, a single-twisted one or a Lang's lay one) using a multifilament yarn can be typically used as each core wire. The average wire diameter of the core wire (the fiber diameter of the twisted cord) may be, for example, about 0.5 to 3 mm, preferably about 0.6 to 2 mm, and more preferably about 0.7 to 1.5 mm. The core wires may be buried in the longitudinal direction of the belt or may be buried side by side at predetermined pitches in parallel with the longitudinal direction of the belt.

In order to improve the adhesion to the ethylene-α-olefin elastomer, various bonding treatments with an epoxy compound, an isocyanate compound, etc. may be performed on the core wires in the same manner as the aforementioned staple fiber of the compression rubber layer.
[Tension Layer]

The tension layer may be formed of a rubber composition similar to that of the compression rubber layer, or may be formed of a cloth (reinforcing cloth) such as canvas. Examples of the cloth (reinforcing cloth) include cloth materials such as woven fabric, wide-angle canvas, knitted cloth, and nonwoven fabric. Among these cloth materials, woven fabric that is woven in the form of a plain weave, a twill weave, or a satin weave, wide angle canvas in which the crossing angle of the warp and weft is approximately in a range of 90° to 120°, and a knitted cloth are preferred. As the fiber that constitutes the reinforcing cloth, the fibers (water absorbable fiber, non-water absorbable fiber, etc.) listed in the aforementioned paragraphs about the knitted cloth for the compression rubber layer can be used.

In addition, a bonding treatment may be performed on the reinforcing cloth. The bonding treatments listed in the aforementioned paragraphs about the staple fiber of the compression rubber layer may be performed. Further, a friction treatment in which the reinforcing cloth and a rubber composition are passed through a calender roll to thereby rub the rubber composition into the reinforcing cloth, a spreading treatment of applying mucilage to the reinforcing cloth, or a coating treatment of laminating a rubber composition on the reinforcing cloth may be performed in place of the bonding treatment used commonly or after the bonding treatment used commonly is performed.

The tension layer may be formed of rubber (a rubber composition). A staple fiber similar to that in the compression rubber layer may be contained in the rubber composition in order to suppress abnormal sound generated by adhesion of the rubber in the back surface when the back surface is driven. The staple fiber may be oriented at random in the rubber composition. Further, the staple fiber may be a staple fiber partially bent.

Further, a concave and convex pattern may be provided in the surface of the tension layer (the back surface of the belt) in order to suppress abnormal sound when the back surface is driven. Examples of the concave and convex pattern include a knitted cloth pattern, a woven fabric pattern, a tire woven fabric pattern, and an emboss pattern. Among those patterns, the woven fabric pattern and the emboss pattern are preferred.

The thickness of the tension layer may be, for example, about 0.5 to 10 mm, preferably about 0.7 to 8 mm, and more preferably about 1 to 5 mm

[Adhesion Layer]

As described above, the adhesion layer is not always required. The adhesion layer (adhesion rubber layer) can be, for example, constituted by a rubber composition (a rubber composition including ethylene-α-olefin elastomer) similar to that of the compression rubber layer. The rubber composition of the adhesion layer may further contain an adhesiveness improver (resorcin-formaldehyde condensate, amino resin, or the like).

The thickness of the adhesion layer may be, for example, about 0.2 to 5 mm, preferably about 0.3 to 3 mm, and more preferably about 0.5 to 2 mm.

Incidentally, in the rubber compositions of the tension layer and the adhesion layer, rubber belonging to the same family or the same kind as the rubber component in the rubber composition of the compression rubber layer is often used as a rubber component. In those rubber compositions, the proportions of additives such as the vulcanizing or crosslinking agent, the co-crosslinking agent or crosslinking aid, the vulcanization accelerator, etc. can be selected respectively from ranges similar to those in the rubber composition of the compression rubber layer.

[V-Ribbed Belt and Manufacturing Method Thereof]

When the V-ribbed belt of the present invention is used, the belt tension is preferably adjusted within a range of 30 to 120 N/rib. For the present invention, torque loss can be further reduced by decreasing the belt tension in this manner. Normally when the belt tension is lowered, slippage occurs easily to generate sound easily. However, in the V-ribbed belt of the present invention in which the frictional power-transmission surface is covered with the knitted cloth, the resistance to sound generation is so excellent that occurrence of abnormal sound can be suppressed even if the belt tension is lowered. The reason will be described below in detail.

That is, abnormal sound may occur from a V-ribbed belt due to slippage caused by misalignment or fluctuation of a friction coefficient. In order to reduce the abnormal sound, the belt tension is often increased as a measure to inhibit the occurrence of slippage between the belt and a pulley. However, when the belt tension is increased, there arises a problem that bending fatigue of the belt is accelerated to reduce the durability, or friction loss in a bearing increases to increase torque loss. On the other hand, for the present invention, since the frictional power-transmission surface of the V-ribbed belt is covered with the knitted cloth, the V-ribbed belt is characterized in that abnormal sound is not generated by slippage easily. Therefore, the belt tension can be reduced in comparison with that in the V-ribbed belt in which the frictional power-transmission surface is not covered with the knitted cloth. Specifically, the V-ribbed belt can be used under a condition of about 30 to 120 N as tension per one rib. For the present invention, the belt tension can be thus reduced so that the torque loss caused by the friction loss in the bearing, or the like can be also reduced. Accordingly, the torque loss can be further reduced in addition to the effect obtained by the use of soft carbon.

A manufacturing method of a V-ribbed belt used commonly can be used for the V-ribbed belt of the present invention. For example, a compression layer formed of a knitted cloth and a rubber composition, a core body and a tension layer are laminated to obtain a laminate. The laminate is molded into a cylindrical shape by a forming mold, and vulcanized to form a sleeve. The vulcanized sleeve is cut into a predetermined width. Thus, a V-ribbed belt in which a frictional power-transmission surface (a compression rubber layer) is covered with the knitted cloth can be manufactured. More in detail, the V-ribbed belt can be manufactured, for example, by the following method.

(First Manufacturing Method)

First, a cylindrical inner mold in which a flexible jacket has been mounted on an outer circumferential surface is used. An unvulcanized sheet for a tension layer is wound around the flexible jacket in the outer circumferential surface. A core wire (twisted cord) forming a core body is wound and spun spirally on the sheet. Further, an unvulcanized sheet for a compression rubber layer and a knitted cloth are wound thereon to prepare a laminate. Next, a cylindrical outer mold having a plurality of rib molds cut in an inner circumferential surface thereof is used as an outer mold which can be mounted on the aforementioned inner mold. The inner mold on which the laminate has been wound is placed concentrically inside the outer mold. After that, the flexible jacket is inflated toward the inner circumferential surface (rib molds) of the outer mold so as to press the laminate (compression rubber layer) into the rib molds, and the laminate is vulcanized. Then the inner mold is taken out from the outer mold, and a vulcanized rubber sleeve having a plurality of ribs is released from the outer mold. Thus, a V-ribbed belt like a sleeve can be prepared. Incidentally, for the V-ribbed belt like a sleeve, the vulcanized rubber sleeve may be cut into a predetermined width in the longitudinal direction of the belt by use of a cutter if necessary, thereby preparing a V-ribbed belt. According to this first manufacturing method, the laminate including the tension layer, the core body, and the compression rubber layer are inflated at a time to be thereby finished into a sleeve having a plurality of ribs (or a V-ribbed belt).

(Second Manufacturing Method)

In relation to the first manufacturing method, for example, a method disclosed in JP-A-2004-82702 (a method in which only a knitted cloth and a compression rubber layer are inflated to form a preliminary molded body (in a semi-vulcanized state), and next a tension layer and a core body are inflated to be crimped to the preliminary molded body so as to be vulcanized and integrated to be thereby finished into a V-ribbed belt) may be used.

EXAMPLES

The present invention will be described in detail below with reference to examples. However, the present invention is not limited by these examples. Methods for preparing a rubber composition, a core wire and a knitted cloth will be shown below.

[Rubber Composition]

A rubber composition shown in Table 3 was rubber-kneaded by a Banbury mixer. The kneaded rubber was passed through a calender roll to prepare an unvulcanized rolled rubber sheet (sheet for a compression rubber layer) with a predetermined thickness. In addition, a rubber composition shown in Table 2 was used to prepare a sheet for a tension layer in the same manner as the sheet for the compression rubber layer. Further, components in a rubber composition for a bonding treatment on the knitted cloth are also shown in Table 2.

EPDM1: "KELTAN (registered trademark) 5260Q" made by LANXESS AG, diene content 2.3 mass %, Mooney viscosity 55

EPDM2: "KELTAN (registered trademark) 2470" made by LANXESS AG, diene content 4.2 mass %, Mooney viscosity 24

Zinc oxide: "ZINC OXIDES SECOND GRADE" made by Seido Chemical Industry Co., Ltd.

Stearic acid: "STEARIC ACID CAMELLIA" made by NOF Corporation

Carbon black SRF: "SEAST (registered trademark) S" made by Tokai Carbon Co., Ltd., average primary particle size 66 nm Carbon black GPF: "SEAST (registered trademark) V" made by Tokai Carbon Co., Ltd., average primary particle size 62 nm Carbon black HAF: "SEAST (registered trademark) 3" made by Tokai Carbon Co., Ltd., average primary particle size 28 nm Carbon black ISAF: "SEAST (registered trademark) 6" made by Tokai Carbon Co., Ltd., average primary particle size 22 nm Softener: "DIANA (registered trademark) PW-380" (paraffin-based process oil) made by Idemitsu Kosan Co., Ltd.

Anti-aging agent: "NOCRAC (registered trademark) MB-O" made by Ouchi Shinko Chemical Industrial Co., Ltd.

Organic peroxide: "PERCUMYL (registered trademark) D-40" made by NOF Corporation, active component 40%

Nylon flock: "Nylon Cut Yarn" made by Nishiyori Co., Ltd., fiber length about 0.5 mm

TABLE 2

| Materials (parts by mass) | Rubber composition for tension layer | Rubber composition for bonding treatment |
| --- | --- | --- |
| EPDM2 | 100 | 100 |
| Zinc oxide | 5 | 5 |
| Stearic acid | 1 | 1 |
| Carbon black HAF | 80 | 80 |
| Anti-aging agent | 2 | 2 |
| Organic peroxide | 5 | 5 |
| Nylon flock | 20 | — |
| Total | 213 | 193 |

[Core Wire]

An aramid cord having a configuration of 1100 dtex/1×4 was used. In order to improve the adhesion to rubber, the core wire was subjected to an immersion treatment with a resorcin-formalin-latex liquid (RFL liquid) in advance, and then subjected to an overcoat treatment with a treatment liquid in which a rubber composition containing EPDM had been dissolved in an organic solvent (toluene).

[Knitted Cloth]

A cotton spun yarn (count 40, one yarn) as a water absorbable fiber and a PTT/PET conjugate composite yarn (fineness 84 dtex) as a non-water absorbable fiber were knitted at a mass ratio of water absorbable fiber/non-water absorbable fiber=80/20 to prepare a knitted cloth having a knitted texture of weft-knitted fabric (two-layer moss stitch). The knitted cloth obtained thus had a thickness of 0.85 mm and a knitted cloth density (wale+course) of 100 yarns per inch. A rubber composition for a bonding treatment shown in Table 2 was dissolved in toluene so that the solid concentration reached 10 mass %, thereby preparing a mucilage. Then a bonding treatment was performed by immersing the knitted cloth in the mucilage obtained thus and drying it at 100° C. for 3 minutes.

The average thickness of the knitted cloth and the density of the knitted cloth were measured as follows. As for the average thickness of the knitted cloth, according to JIS L 1096 (2010), the knitted cloth from which unnatural wrinkles and tension were removed was placed on a flat table, and the thickness was measured at five places by a constant load type thickness meter. An average value was calculated as an average thickness. As for the density of the knitted cloth, according to JIS L 1096 (2010), the knitted cloth from which unnatural wrinkles and tension were removed was placed on a flat table, and the number of loops in a length of one inch was measured at five places. An average value was calculated as an average density.

Examples 1 to 5 and Comparative Examples 2 to 4

[Preparation of V-Ribbed Belt]

A cylindrical inner mold in which a flexible jacket had been mounted on an outer circumferential surface was used. An unvulcanized sheet for a tension layer was wound around the flexible jacket on the outer circumferential surface. A core wire (twisted cord) forming a core body was wound and spun spirally on the sheet. Further, an unvulcanized sheet for a compression rubber layer formed of a rubber composition shown in Table 3 and the knitted cloth were wound thereon to prepare a laminate. The inner mold on which the cylindrical laminate had been wound was placed concentrically inside a cylindrical outer mold having a plurality of rib molds cut in an inner circumferential surface thereof. The flexible jacket was inflated to press the laminate into the rib molds, and then the laminate was vulcanized at 180° C. Then the inner mold was taken out from the outer mold, and a vulcanized rubber sleeve having a plurality of ribs was released from the outer mold. The vulcanized rubber sleeve was cut into a predetermined width in the longitudinal direction of the belt by use of a cutter to prepare a V-ribbed belt (number of ribs: 5, circumferential length: 1,500 mm, belt shape: K-shape, belt thickness: 4.3 mm, rib height: 2 mm, rib pitch: 3.56 mm).

(Rubber Hardness of Compression Rubber Layer)

A sheet for a compression rubber layer was pressed and vulcanized at a temperature of 180° C. for 20 minutes to thereby prepare a vulcanized rubber sheet (100 mm square and 2 mm thick). A laminate in which three vulcanized rubber sheets obtained thus had been put on top of one another was used as a specimen, and hardness of the laminate was measured in accordance with JIS K6253 (2012), by use of a durometer A-type hardness testing machine. Measuring results are shown in Table 3.

(Soft Carbon/Hard Carbon Ratio in Compression Rubber Layer)

Primary particle sizes of 100 particles of carbon black sampled at random in the vulcanized rubber sheet prepared for measuring the rubber hardness were measured, and the ratio of the number of primary particles of the carbon black with a primary particle size of 40 nm or more to the number of primary particles of the carbon black with a primary particle size of less than 40 nm was obtained. A measuring sample having a thickness of 100 nm was sampled from the vulcanized rubber sheet and magnified at 100,000 times by use of a transmission electron microscope ("JEM-2100" made by JEOL Ltd.). A diameter (diameter of equivalent area circle) of a circle having an area same as a projected area of a primary particle of the carbon black was measured as the primary particle size of the carbon black. Measuring results are shown in Table 3.

(Torque Loss Measuring Conditions)

Figure 2:
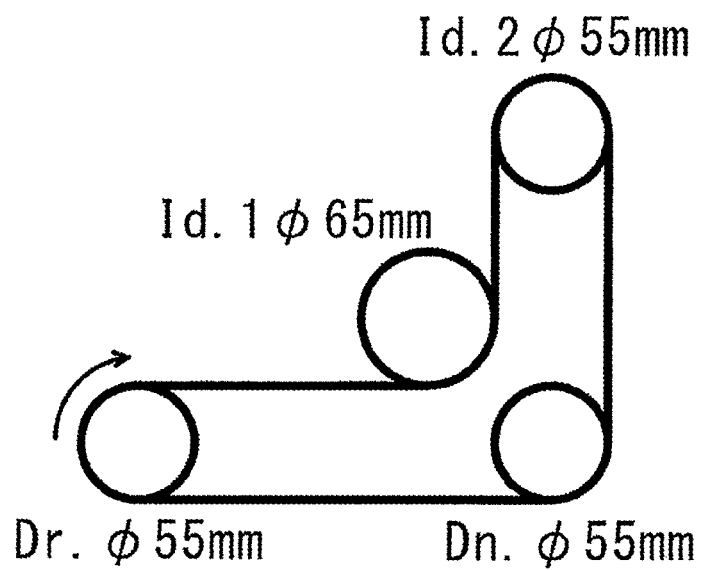
FIG. 2 is a schematic view showing a layout of a testing machine for measuring torque loss in examples.

Torque loss was measured by use of a 4-axis running testing machine having a layout shown in FIG. 2 in which a driving pulley (Dr.) having a diameter of 55 mm, an idler pulley 1 (Id. 1) having a diameter of 65 mm, an idler pulley 2 (Id. 2) having a diameter of 55 mm, and a driven pulley (Dn.) having a diameter of 55 mm were disposed in that order. A V-ribbed belt (number of ribs 5, circumferential length 1,500 mm) was laid on the pulleys of the 4-axis running testing machine. For each belt obtained in Example 1 and Comparative Example 2, torque loss was measured while changing the belt tension under conditions that the atmospheric temperature was 60° C., the rotation speed of the driving pulley was 2,000 rpm, and no load was applied to the idler pulley and the driven pulley. Results obtained thus are shown in Table 3. The torque loss was calculated as follows. That is, torque of the driving pulley and torque of the driven pulley were measured, and the torque measured in the driven pulley was subtracted from the torque measured in the driving pulley (torque loss=torque measured in driving pulley−torque measured in driven pulley). Incidentally, for all the belts obtained in Examples and Comparative Examples, torque loss calculated from torque measured with a belt tension of 40 N/rib is shown in Table 3.

(Actual Machine Driving Torque Measuring Conditions)

Figure 4:
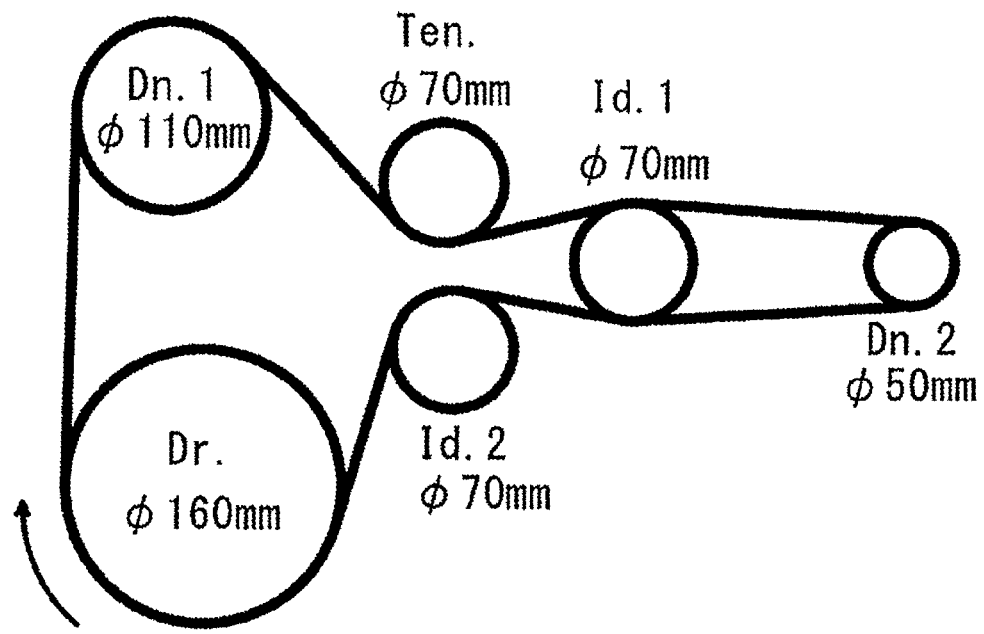
FIG. 4 is a schematic view showing a layout of a testing machine for measuring driving torque in the examples.
Figure 5:
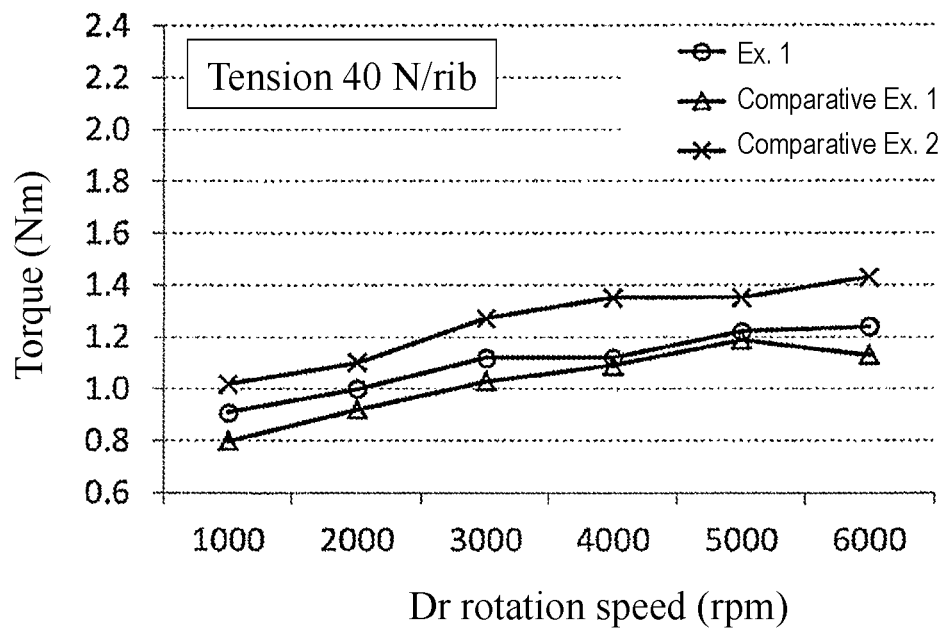
FIG. 5 is a graph showing measuring results of driving torque at a belt tension of 40 N/rib in Example 1 and Comparative Examples 1 and 2.
Figure 6:
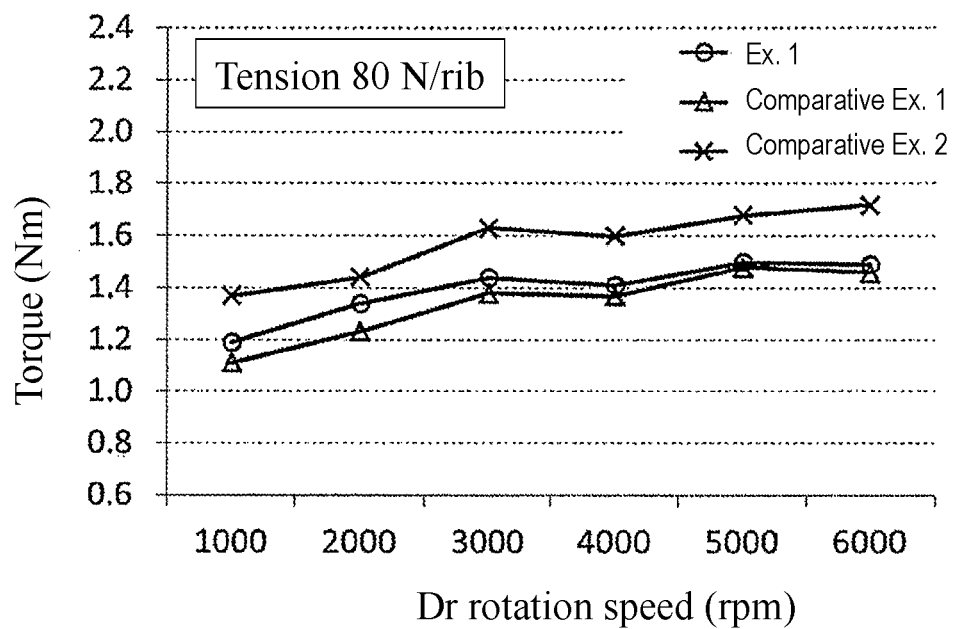
FIG. 6 is a graph showing measuring results of driving torque at a belt tension of 80 N/rib in Example 1 and Comparative Examples 1 and 2.
Figure 7:
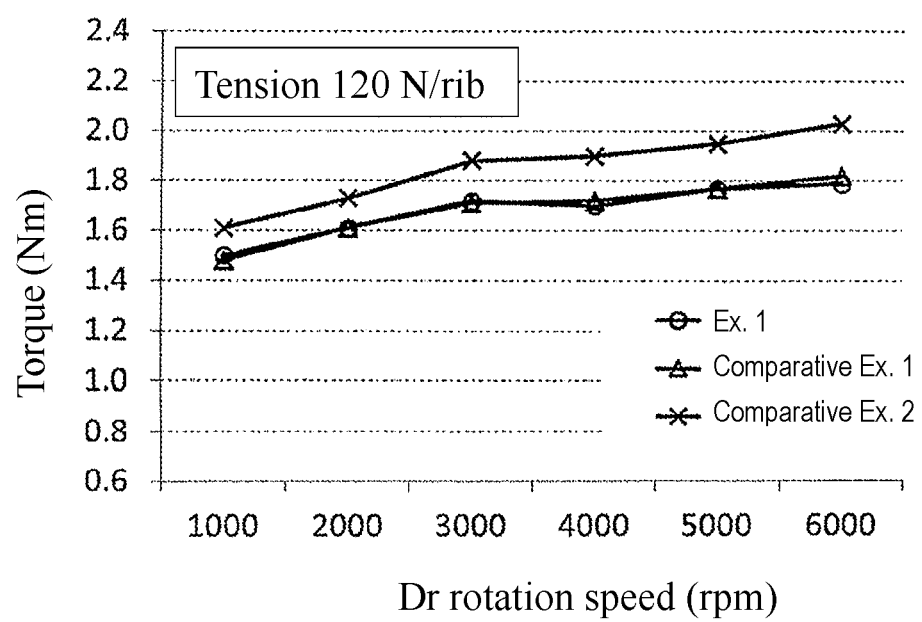
FIG. 7 is a graph showing measuring results of driving torque at a belt tension of 120 N/rib in Example 1 and Comparative Examples 1 and 2.

Driving torque was measured by use of an engine having a layout shown in FIG. 4 in which a driving pulley (Dr.) having a diameter of 160 mm, a driven pulley 1 (Dn. 1) having a diameter of 110 mm, a tensioner pulley (Ten.) having a diameter of 70 mm, an idler pulley 1 (Id. 1) having a diameter of 70 mm, a driven pulley 2 (Dn. 2) having a diameter of 50 mm, and an idler pulley 2 (Id. 2) having a diameter of 70 mm were disposed in that order. A V-ribbed belt (number of ribs 5, circumferential length 1,500 mm) was laid on the pulleys of the engine. For each belt obtained in Example 1 and Comparative Example 2, driving torque of the driving pulley was measured while changing the rotation speed of the driving pulley between 1,000 rpm and 6,000 rpm on conditions that the atmospheric temperature was 23° C., and the belt tension was set in three stages, that is, 40 N/rib, 80 N/rib and 120 N/rib, and the results thereof are shown in FIGS. 5 to 7. For all the belts obtained in Examples and Comparative Examples, the driving torque calculated from the torque measured with a belt tension of 80 N/rib and a rotation speed of the driving pulley of 3,000 rpm is shown in Table 3. It can be confirmed that the effect of improving fuel economy is higher as driving torque is reduced.

(Test for Resistance to Sound Generation)

Presence or absence of sound generation was checked by the 4-axis running testing machine used for the torque loss measurement while gradually increasing the misalignment angle of the driven pulley. When sound was generated at a misalignment angle of 3 degrees or less, the resistance to sound generation was determined to be low (x). When the misalignment angle at which sound was generated was beyond 3 degrees, the resistance to sound generation was determined to be high (0). The resistance to sound generation was evaluated on two kinds of belts, that is, the belt before running and the belt after the running (the belt which had run for 100 hours with a belt tension of 120 N/rib and a rotation speed of the driving pulley of 6,000 rpm in the aforementioned actual machine driving torque measurement).

Comparative Example 1

A V-ribbed belt was prepared in the same manner as in Comparative Example 2, except that the knitted cloth was not used. Results of properties similar to those in Example 1 and Comparative Example 2 are shown in FIG. 3, FIGS. 5 to 7, and Table 3.

TABLE 3

| | | Examples | | | | | Comparative Examples | | | |
|---|---|---|---|---|---|---|---|---|---|---|
| | | 1 | 2 | 3 | 4 | 5 | 1 | 2 | 3 | 4 |
| Compression rubber composition (parts by mass) | EPDM1 | 100 | 100 | 100 | — | 100 | — | — | 100 | 100 |
| | EPDM2 | — | — | — | 100 | — | 100 | 100 | — | — |
| | Zinc oxide | 5 | 5 | 5 | 5 | 5 | 5 | 5 | 5 | 5 |
| | Stearic acid | 1 | 1 | 1 | 1 | 1 | 1 | 1 | 1 | 1 |
| | Carbon black SRF | 50 | 70 | 40 | 50 | — | — | — | — | 80 |
| | Carbon black GPF | — | — | — | — | 50 | — | — | — | — |

TABLE 3-continued

| | | Examples | | | | | Comparative Examples | | | |
|---|---|---|---|---|---|---|---|---|---|---|
| | | 1 | 2 | 3 | 4 | 5 | 1 | 2 | 3 | 4 |
| | Carbon black HAF | 40 | 20 | 50 | 40 | — | 80 | 80 | 80 | — |
| | Carbon black ISAF | — | — | — | — | 40 | — | — | — | — |
| | Softener | 5 | 5 | 5 | 5 | 5 | 10 | 10 | 5 | 5 |
| | Anti-aging agent | 2 | 2 | 2 | 2 | 2 | 2 | 2 | 2 | 2 |
| | Organic peroxide | 3 | 3 | 3 | 3 | 3 | 5 | 5 | 3 | 3 |
| Rubber hardness | | 83 | 82 | 83 | 78 | 84 | 81 | 81 | 88 | 79 |
| Soft carbon/hard carbon ratio | | 9/91 | 21/79 | 6/94 | 9/91 | 5/95 | 1/99 | 1/99 | 1/99 | 98/2 |
| Rib-face knitted cloth | | present | present | present | present | present | absent | present | present | present |
| Torque loss | | 0.2 | 0.2 | 0.21 | 0.19 | 0.21 | 0.19 | 0.27 | 0.35 | 0.2 |
| Driving torque | | 1.44 | 1.42 | 1.45 | 1.41 | 1.46 | 1.38 | 1.63 | 1.72 | 1.38 |
| Resistance to sound generation (before running) | | ○ | ○ | ○ | ○ | ○ | x | ○ | ○ | ○ |
| Resistance to sound generation (after running) | | ○ | ○ | ○ | x | ○ | x | ○ | ○ | occurrence of cracking |

As is apparent from the results in Table 3, since Comparative Example 1 had a structure in which each rib face was not covered with a knitted cloth, bendability was excellent and torque loss was small. However, since each rib face was not covered with a knitted cloth, resistance to sound generation was low.

In Comparative Examples 2 and 3, since each rib face was covered with a knitted cloth, resistance to sound generation was high. However, since the proportion of the soft carbon was low and each rib face was covered with the knitted cloth, bendability deteriorated and torque loss was large.

In Comparative Example 4, since the proportion of the hard carbon was low, the reinforcing performance of carbon black deteriorated so that the compression rubber layer was cracked in the belt after running with a high load.

In Examples 1 to 5, since each rib face was covered with a knitted cloth, resistance to sound generation was high. Further, the rubber composition contained the soft carbon and the hard carbon at a predetermined ratio so as to inhibit heat generation. This may result in small torque loss and thus good results. Incidentally, in Example 4, the Mooney viscosity of EPDM was so low that rubber could seep out to the frictional power-transmission surface easily. This may result in that resistance to sound generation deteriorated slightly in comparison with that in any other Example and thus the resistance to sound generation deteriorated in the belt after running with a high load.

Figure 3:
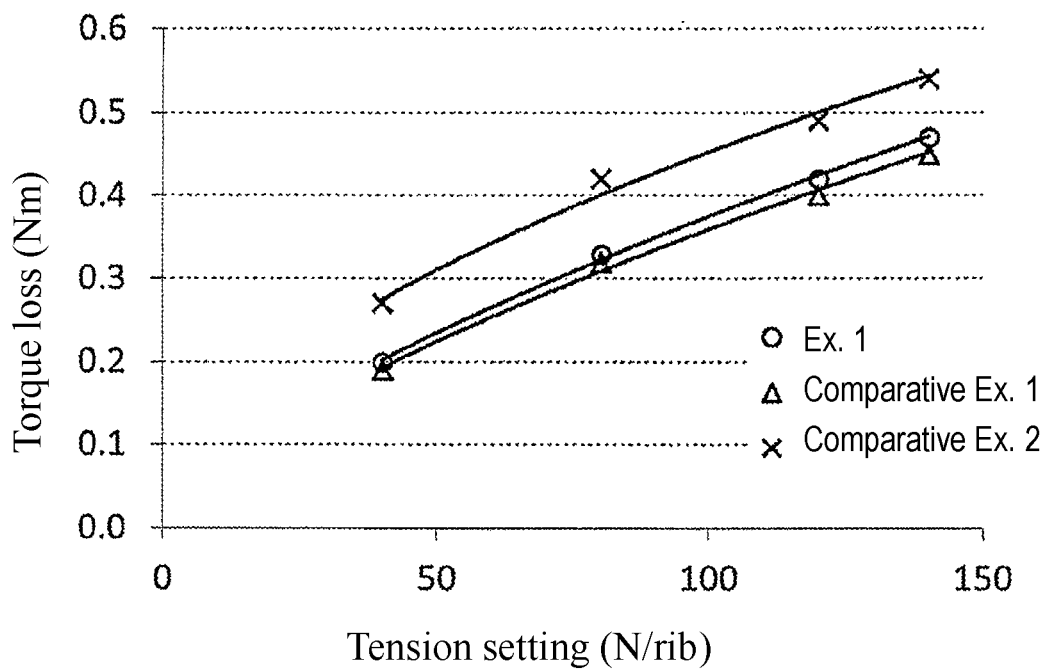
FIG. 3 is a graph showing measuring results of torque loss in Example 1 and Comparative Examples 1 and 2.

In addition, as is apparent from FIG. 3 in which Example 1 and Comparative Examples 1 and 2 were compared as to torque loss, the torque loss was the largest in Comparative Example 2 in which the proportion of soft carbon in the rubber composition was low and each rib face was covered with a knitted cloth. Although each rib face was covered with a knitted cloth in Example 1, since the rubber composition contained the soft carbon and the hard carbon at a predetermined ratio, the torque loss was as small as in Comparative 1 in which each rib face was not covered with a knitted cloth.

Further, as is apparent from FIGS. 5 to 7 in which Example 1 and Comparative Examples 1 and 2 were compared as to actual machine driving torque, the measuring results showed the same tendency as the torque loss (4-axis layout) of FIG. 3. That is, the driving torque was large in Comparative Example 2, and the driving torque was small in Comparative Example 1 and Example 1. In addition, it is also understood that when the belt tension is reduced, the driving torque can be reduced largely as a whole. For the present invention, since each rib face is covered with a knitted cloth, resistance to sound generation is high, and the belt tension can be adjusted to be low. Thus, the torque loss can be reduced further in addition to the effect of reducing the torque loss by the soft carbon.

INDUSTRIAL APPLICABILITY

A V-ribbed belt of the present invention can improve durability and resistance to sound generation and can also reduce torque loss. Accordingly, the V-ribbed belt can be used as a V-ribbed belt for an automobile, a motorcycle, an agricultural machine, etc. Since the torque loss can be reduced even in power transmission with a high load, the V-ribbed belt is useful particularly for a V-ribbed belt for driving accessories of an automobile.

The present invention has been described in detail and with reference to a specific embodiment. However, it is obvious for those in the art that various modifications or changes can be made without departing from the spirit and scope of the present invention.

The present application is based on Japanese Patent Application No. 2018-025137 filed on Feb. 15, 2018, and Japanese Patent Application No. 2019-014655 filed on Jan. 30, 2019, the contents of which are incorporated herein by reference.

REFERENCE SIGNS LIST

1 . . . V-ribbed belt
2 . . . compression rubber layer
3 . . . core body
4 . . . tension layer
5 . . . knitted cloth

The invention claimed is:
1. A V-ribbed belt comprising:
a compression rubber layer having a frictional power-transmission surface covered with a knitted cloth,
wherein
the compression rubber layer comprises a cured material of a rubber composition comprising an ethylene-α-olefin elastomer and a carbon black, the carbon black comprises a soft carbon having a primary particle size of 40 nm or more and a hard carbon having a primary particle size of less than 40 nm, a ratio of number of particles between the soft carbon and the hard carbon satisfies a relation of former/latter=3/97 to 15/85, the rubber composition further comprises a staple fiber having a proportion of 10 parts by mass or lower with respect to 100 parts by mass of the ethylene-α-olefin elastomer, and the carbon black has a proportion of 70 parts by mass or higher and 150 parts by mass or lower with respect to 100 parts by mass of the ethylene-α-olefin elastomer.

2. The V-ribbed belt according to claim 1, wherein the soft carbon has an average primary particle size of 45 to 100 nm, and the hard carbon has an average primary particle size of 10 to 35 nm.

3. The V-ribbed belt according to claim 1, wherein the carbon black has a proportion of 30 parts by mass or higher with respect to 100 parts by mass of the ethylene-α-olefin elastomer.

4. The V-ribbed belt according to claim 1, wherein the rubber composition further comprises a vulcanizing agent and a crosslinking agent, and a total proportion of the vulcanizing agent and the crosslinking agent is 1 to 5 parts by mass with respect to 100 parts by mass of the ethylene-α-olefin elastomer.

5. The V-ribbed belt according to claim 1, wherein the ethylene-α-olefin elastomer has a diene content of 1 to 3 mass %.

6. The V-ribbed belt according to claim 1, wherein the ethylene-α-olefin elastomer has a Mooney viscosity (ML (1+4)125° C.) of 30 to 60.

7. Use of the V-ribbed belt according to claim 1, under a belt tension of 30 to 120 N/rib.

8. The V-ribbed belt according to claim 1, wherein the rubber composition further comprises a crosslinking agent, and a total proportion of the crosslinking agent is 1 to 5 parts by mass with respect to 100 parts by mass of the ethylene-α-olefin elastomer.

9. The V-ribbed belt according to claim 1, wherein the rubber composition further comprises a vulcanizing agent, and a total proportion of the vulcanizing agent is 1 to 5 parts by mass with respect to 100 parts by mass of the ethylene-α-olefin elastomer.

* * * * *